(12) United States Patent
Gass

(10) Patent No.: US 8,050,273 B2
(45) Date of Patent: Nov. 1, 2011

(54) LAWFUL INTERCEPTION IN IP NETWORKS

(75) Inventor: Raymond Gass, Bolsenheim (FR)

(73) Assignee: Alcatel Lucent, Paris (FR)

( * ) Notice: Subject to any disclaimer, the term of this patent is extended or adjusted under 35 U.S.C. 154(b) by 822 days.

(21) Appl. No.: 11/472,315

(22) Filed: Jun. 22, 2006

(65) Prior Publication Data

US 2007/0297376 A1    Dec. 27, 2007

(51) Int. Cl.
*H04L 12/28*    (2006.01)

(52) U.S. Cl. ..................... 370/395.2; 370/400

(58) Field of Classification Search ............ 370/338
See application file for complete search history.

(56) References Cited

U.S. PATENT DOCUMENTS

| | | | | |
|---|---|---|---|---|
| 5,940,376 A * | 8/1999 | Yanacek et al. | ............... | 370/250 |
| 2002/0159442 A1 * | 10/2002 | Quigley et al. | ............... | 370/352 |
| 2003/0120763 A1 * | 6/2003 | Volpano | ........................ | 709/223 |
| 2003/0133412 A1 * | 7/2003 | Iyer et al. | ....................... | 370/235 |
| 2004/0202295 A1 * | 10/2004 | Shen et al. | ................. | 379/112.01 |
| 2004/0219911 A1 * | 11/2004 | Kouchri et al. | ................. | 455/423 |
| 2005/0278565 A1 * | 12/2005 | Frattura et al. | ..................... | 714/5 |
| 2006/0245436 A1 * | 11/2006 | Sajassi | ..................... | 370/395.53 |
| 2006/0259966 A1 * | 11/2006 | IInicki | ............................ | 726/22 |
| 2007/0097972 A1 * | 5/2007 | Jain et al. | ....................... | 370/392 |

FOREIGN PATENT DOCUMENTS

EP       1389862 B1    11/2004

* cited by examiner

*Primary Examiner* — Chirag Shah
*Assistant Examiner* — Daniel Mitchell
(74) *Attorney, Agent, or Firm* — Fay Sharpe LLP

(57) ABSTRACT

A method to provide lawful interception of a device in a network, the network comprising defining Virtual Local Area Networks (VLAN), wherein a lawful interception device of the network defines a Virtual Local Area Network where at least the device to intercept and the lawful interception device are members.

18 Claims, 2 Drawing Sheets

LAWFUL INTERCEPTION IN IP NETWORKS

FIELD OF THE INVENTION

The invention relates to a method to provide lawful interception of a device in a network.

BACKGROUND OF THE INVENTION

Lawful interception is the lawfully authorized interception and monitoring of communications of an intercept subject. This is the process of intercepting within a network, communications between parties of interest. The interception is legally authorised and is conducted without the intercepted parties being aware of it. Lawful Interception is often referred to as 'wiretapping' or 'phone-tapping'.

Several techniques where introduced to allow lawful interception in telephone networks, but solutions based on line-switched networks are not applicable in packet switched networks like voice over IP.

EP 1 389 862 discloses a lawful interception device to monitor media streams of two IP parties includes a SIP (Session Initiation Protocol) proxy server or a MGC (Media Gateway Controller) to detect information in the signalling information being transmitted between the two IP (Internet Protocol) parties and to generate instructions out of the detected signalling information for instructing a RTP (Real-time Transport Protocol) proxy server to create channels to bypass a media stream to be intercepted via an intermediate storage medium. Due to adaptation of connection parameters in the SDP (Session Description Protocol) part of the SIP messages sent to the IP parties the interception is transparent to the IP parties.

Lawful interception in state of the art networks need especially designed proxy servers.

OBJECTS OF THE INVENTION

It is an object of the invention, to provide lawful interception without the requirement of a special designed network and based on the use of existing network protocols.

SUMMARY OF THE INVENTION

The above mentioned problem is solved by a method to provide lawful interception of a device in a network, the network comprising means to define Virtual Local Area Networks, where a lawful interception device of the network defines a Virtual Local Area Network where at least the device to intercept and the lawful interception device are members. Preferably, the lawful interception device is able to define the VLAN itself, e.g. without using functions of the switch in the network. To achieve this, the lawful interception device can act as a switch and exchange VLAN definition information with the "real" switch in the network.

In a preferred embodiment, the Generic Attribute Registration Protocol (GARP) VLAN Registration Protocol (GVRP) is used to define a VLAN between the lawful interception device and the device to intercept.

In a preferred embodiment, the lawful interception device and the device to intercept are in different static broadcast domains. A static broadcast domain is a network, where broadcasts are transmitted to all devices in the network. This means, that at least one router is placed between the networks. In another preferred embodiment, the lawful interception device and the device to intercept are in the same static broadcast domain. This is usually the situation in switched LANs.

The above mentioned problem is also solved by a customer premises equipment (CPE) comprising means to join a Virtual Local Area Network. Preferably, the lawful interception device comprises means to act as a switch. In a further preferred embodiment, the customer premises equipment and/or the lawful interception device comprise means to exchange information by using Generic Attribute Registration Protocol (GARP) Virtual Local Area Network Registration Protocol (GVRP).

DETAILED DESCRIPTION OF THE INVENTION

Figure 1:
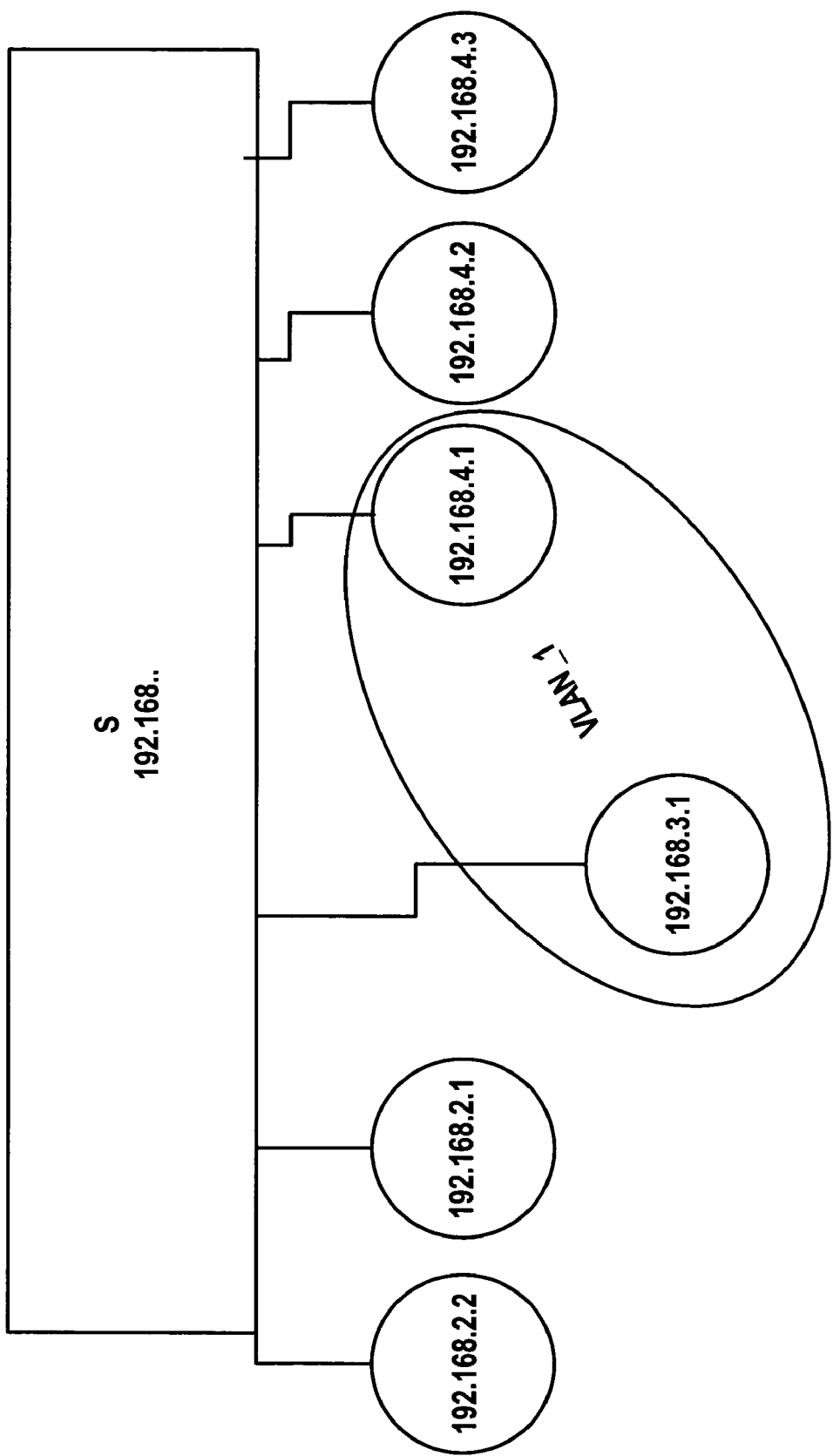
FIG. 1 a sketch of a switched network.

Virtual LANs (VLANs) have recently developed into an integral feature of switched LAN solutions. In a network using only routers for segmentation, segments and broadcast domains correspond on a one-to-one basis. Each segment typically contains between 30 and 100 users. With the introduction of switching, a network can be divided into smaller, layer 2-defined segments, enabling increased bandwidth per segment.

A VLAN is a switched network that is logically segmented on an organizational basis, e.g. by functions, project teams, or applications rather than on a physical or geographical basis. For example, all workstations and servers used by a particular workgroup team can be connected to the same VLAN, regardless of their physical connections to the network or the fact that they might be intermingled with other teams. Reconfiguration of the network can be done through software rather than by physically unplugging and moving devices or wires.

A VLAN can be thought of as a broadcast domain that exists within a defined set of switches. A VLAN consists of a number of end systems, either hosts or network equipment (such as bridges and routers), connected by a single bridging domain. The bridging domain is supported on various pieces of network equipment; for example, LAN switches that operate bridging protocols between them with a separate bridge group for each VLAN.

VLANs are created to provide the segmentation services traditionally provided by routers in LAN configurations. VLANs allow logical network topologies to overlay the physical switched infrastructure such that any arbitrary collection of LAN ports can be combined into an autonomous user group or community of interest. The technology logically segments the network into separate Layer 2 broadcast domains whereby packets are switched between ports designated to be within the same VLAN.

VLAN switching is accomplished through frame tagging where traffic originating and contained within a particular virtual topology carries a unique VLAN identifier (VLAN ID) as it traverses a common backbone or trunk link. The VLAN ID enables VLAN switching devices to make intelligent forwarding decisions based on the embedded VLAN ID. Each VLAN is differentiated by a colour, or VLAN identifier. The unique VLAN ID determines the frame colouring for the VLAN. Packets originating and contained within a particular VLAN carry the identifier that uniquely defines that VLAN (by the VLAN ID).

The VLAN ID allows VLAN switches and routers to selectively forward packets to ports with the same VLAN ID. The switch that receives the frame from the source station inserts the VLAN ID and the packet is switched onto the shared backbone network. When the frame exits the switched LAN, a switch strips header and forwards the frame to interfaces that match the VLAN colour. There exists some network management product such as VlanDirector allowing to colour code the VLANs and monitor VLAN graphically.

Many initial VLAN implementations define VLAN membership by groups of switch ports (for example, ports 1, 2, 3, 7, and 8 on a switch make up VLAN A, while ports 4, 5, and 6 make up VLAN B). Furthermore, in most initial implementations, VLANs could only be supported on a single switch. Second-generation implementations support VLANs that span multiple switches (for example, ports 1 and 2 of switch #1 and ports 4, 5, 6, and 7 of switch #2 make up VLAN A; while ports 3, 4, 5, 6, 7, and 8 of switch #1 combined with ports 1, 2, 3, and 8 of switch #2 make up VLAN B). Port grouping is still the most common method of defining VLAN membership, and configuration is fairly straightforward. Defining VLANs purely by port group does not allow multiple VLANs to include the same physical segment (or switch port). However, the primary limitation of defining VLANs by port is that the network manager must reconfigure VLAN membership when a user moves from one port to another.

Membership by MAC (Medium Access Control) Address VLAN membership based on MAC-layer address has a different set of advantages and disadvantages. Since MAC-layer addresses are hardwired into the workstation's network interface card (NIC), VLANs based on MAC addresses enable network managers to move a workstation to a different physical location on the network and have that workstation automatically retain its VLAN membership. In this way, a VLAN defined by MAC address can be thought of as a user based VLAN. One of the drawbacks of MAC address-based VLAN solutions is the requirement that all users must initially be configured to be in at least one VLAN. After that initial manual configuration, automatic tracking of users is possible. IP multicast groups represent a different approach to VLAN definition, although the fundamental concept of VLANs as broadcast domains still applies. When an IP packet is sent via multicast, it is sent to an address that is a proxy for an explicitly defined group of IP addresses that is established dynamically. Each workstation is given the opportunity to join a particular IP multicast group by responding affirmatively to a broadcast notification, which signals that group's existence. All workstations that join an IP multicast group can be seen as members of the same virtual LAN. However, they are only members of a particular multicast group for a certain period of time. Therefore, the dynamic nature of VLANs defined by IP multicast groups enables a very high degree of flexibility and application sensitivity. In addition, VLANs defined by IP multicast groups would inherently be able to span routers and thus WAN connections.

Due to the trade-offs between various types of VLANs, multiple methods of VLAN definition may be used simultaneously. Such a flexible definition of VLAN membership enables network managers to configure their VLANs to best suit their particular network environment. For example, by using a combination of methods, an organization that utilizes both IP and NetBIOS (Network Basic Input/Output System) protocols could define IP VLANs corresponding to pre-existing IP subnets, and then define VLANs for NetBIOS end stations by dividing them by groups of MAC layer addresses. VLAN supports transmission of RTP (Real-Time Transport Protocol), an Internet protocol for transmitting real-time data such as audio or video ones up to multimedia data.

A system that fully automates VLAN configuration implies that workstations automatically and dynamically join VLANs depending on application, user ID, or other criteria or policies that are preset by an administrator. Communicating VLAN Membership Information Switches must have a way of understanding VLAN membership (that is, which stations belong to which VLAN) when network traffic arrives from other switches; otherwise, VLANs would be limited to a single switch.

The IEEE 802.1Q frame tag defines a method for inserting a tag into an IEEE MAC-layer frame that defines membership in a virtual LAN. During the standardization process, engineers sneaked in an extra few bits to define class of service. 802.1Q is designed to simplify VLAN configuration and management. It specifies a way to define and set up VLANs in frame-based networks such as Ethernet and token ring. IEEE 802.1Q is a tagging scheme in which a VLAN ID is inserted into the layer 2 frame header. The VLAN ID associates a frame with a specific VLAN and provides the information that switches need to create VLANs across the network.

The 802.1Q standard defines the forwarding of frames based on tag information, explicit sharing of VLAN information and exchange of topology information, and VLAN management and configuration.

A VLAN protocol called GARP (Generic Attribute Registration Protocol) propagates topology information to network switches and end stations via tags. Also, a registration protocol called GVRP (GARP VLAN Registration Protocol) controls various aspects of the VLAN join/drop process.

The GARP VLAN Registration Protocol (GVRP) defines a GARP application that provides the 802.1Q-compliant VLAN pruning and dynamic VLAN creation on 802.1Q trunk ports. GVRP is an application defined in the IEEE 802.1P standard that allows for the control of 802.1Q VLANs.

GVRP enables a switch to dynamically create 802.1Q-compliant VLANs on links with other devices running GVRP. This enables the switch to automatically create VLAN links between GVRP-aware devices. (A GVRP link can include intermediate devices that are not GVRP-aware.) This operation reduces the chances for errors in VLAN configuration by automatically providing VLAN ID (VID) consistency across the network. With GVRP, the switch can exchange VLAN configuration information with other GVRP switches, prune unnecessary broadcast and unknown unicast traffic, and dynamically create and manage VLANs on switches connected through 802.1Q trunk ports. GVRP makes use of GID and GIP, which provide the common state machine descriptions and the common information propagation mechanisms defined for use in GARP-based applications. GVRP runs only on 802.1Q trunk links. GVRP prunes trunk links so that only active VLANs will be sent across trunk connections. GVRP expects to hear join messages from the switches before it will add a VLAN to the trunk. GVRP updates and hold timers can be altered. GVRP ports run in various modes to control how they will prune VLANs. GVRP can be configured to dynamically add and manage VLANS to the VLAN database for trunking purposes In other words, GVRP allows the propagation of VLAN information from device to device or end-node. With GVRP, a single switch is manually configured with all the desired VLANs for the network, and all other switches on the network learn those VLANs dynamically. An end-node can be plugged into any switch and be connected to that end-node's desired VLAN. For end-nodes to make use of GVRP, they need GVRP-aware Network Interface Cards (NICs). The GVRP-aware NIC is configured with the desired VLAN or VLANs, then connected to a GVRP-enabled switch. The NIC communicates with the switch, and VLAN connectivity is established between the NIC and switch.

FIG. 1 exemplifies a simple configuration in a Local Area Network (LAN) comprising only one switch S, where a multitude of devices (or end-nodes) are connected to the Switch S. In FIG. 1, the devices are identified by an IP-Address. For illustration purposes, the devices belong to different (static) class-C networks, two of them to 192.168.2.0, three to 192.168.4.0 and one to 192.168.3.0. In this configuration, the devices 192.168.2.1 and 192.168.2.2 as well as the devices 192.168.4.1, 192.168.4.2 and 192.168.4.3 are able to communicate with each other without routing. A communication between the subnets would only be able via a router.

The switch S is capable to define VLANs, e.g. via GARP or GVRP or the like. Additionally, the device (end-node) 192.168.3.1 is able to act as a switch (if end-nodes are not able to dynamically define a VLAN). The device 192.168.3.1 creates a VLAN_1 by sending an appropriate request to the switch S. As shown in FIG. 1, the device 192.168.3.1, which is a "lawful interception device", might create a VLAN with only one further member, the device 192.168.4.1.

Now all traffic from and to 192.168.4.1 is local (in the same broadcast domain) for device 192.168.3.1, therefore 192.168.3.1 can examine all network traffic of device 192.168.4.1 e.g. the RTP channels over which are transmitted multimedia data particularly a voice communication or even video or fax transmission.

Figure 2:
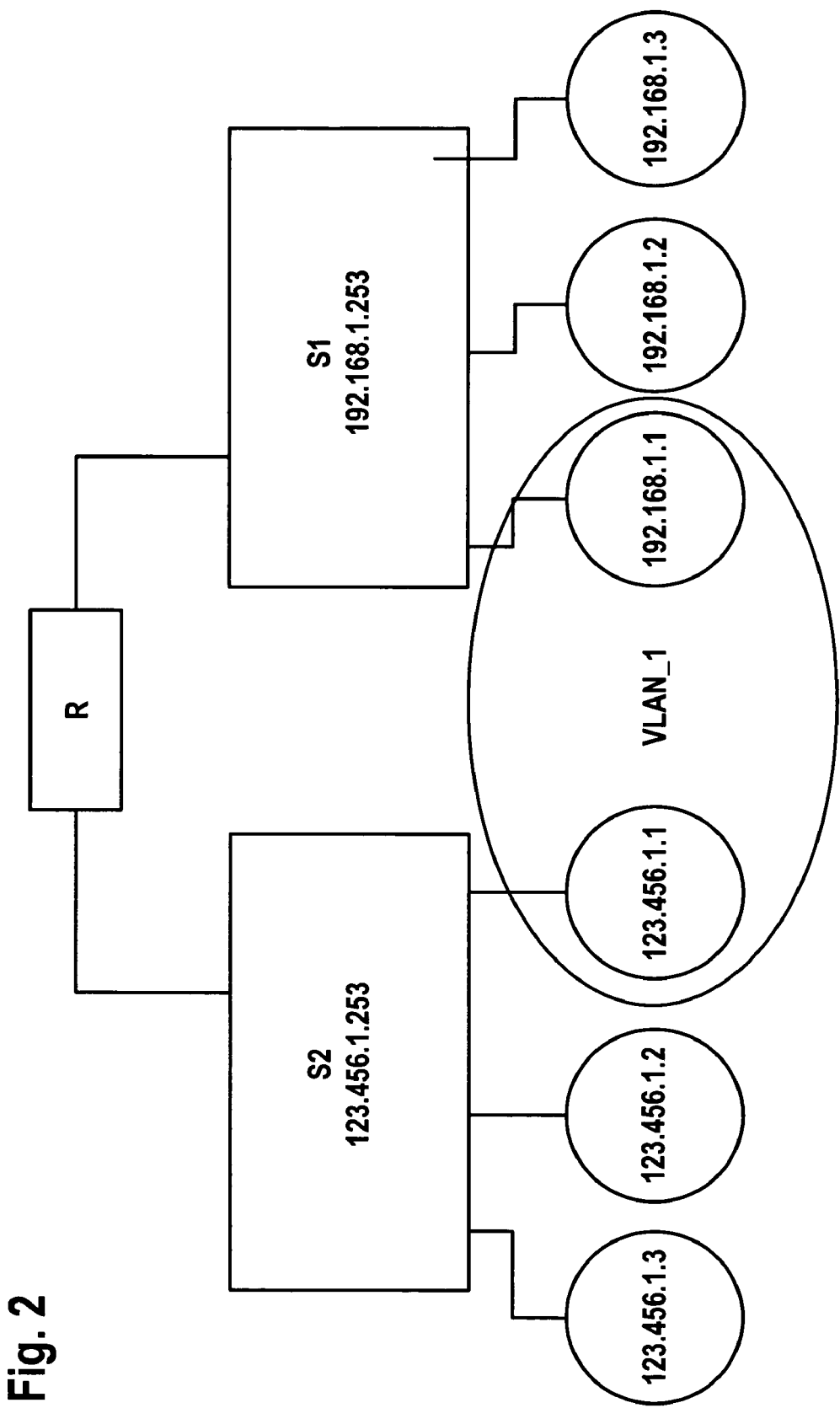
FIG. 2 a sketch of a routed network with switches.

The approach described above for one switch is also practicable for a network comprising routers. Therefore, the switches must have the possibility to exchange VLAN-information across routers, which is possible in all examples of standards described initially. FIG. 2 describes such an example of a routed network. Two switches S1 and S2 are connected via a router R (or a multitude of routers, e.g. the internet. Both switches are capable of creating VLANs. A lawful interception device 192.168.1.1 in subnet 192.168.1.0 creates a VLAN beyond the broadcast domain of the router S1's network with a device 123.456.1.1 in network 123.456.0.0. Only the devices 192.168.1.1 and the device 123.456.1.1 are members of the VLAN. As in the example of FIG. 1, the lawful-interception device 192.168.1.1 is able now to listen to all traffic to and from device 123.456.1.1.

The described method is furthermore applicable in IP telephone ("voice over IP") networks with Customer Premises equipment (CPE) being connected via ADSL, ISDN or the like to other networks. Furthermore, the implementation of a lawful interception according to the invention can be based on the use of existing tools (e.g. VLANid declared through the use of management protocols such as SNMP—Simple Network Management Protocol), or on the use of specific tools. Latter tools comprising possibly a Graphical User Interface allow to hide to the "interceptor" the complexity of the operation when setting up a lawful interception according to the invention. Indeed, some rather high skilled knowledge (usual knowledge of a system manager) are required to be able to allocate the specific address of the device or end-node being e.g. a VoIP phone or a Fax over IP terminal to be lawfully intercept i.e. its port or MAC and/or IP address, latter usually being dynamically set, into a particular VLAN on the existing network. Such particular VLAN may be exclusively assigned to the "interceptor" and may possibly require administrations rights. The interceptor is then able from his/her terminal being the lawful interception device possibly but not exclusively of the same kind as the one to be intercepted and being part of that VLAN to analyse the intercepted data. For example, it is possible according to the invention to play any intercepted data when being of a voice kind possibly originating from a communication to be heard or to display that data when being a fax or any other readable type of data (SMS, MMS like).

The invention claimed is:

1. A method to provide lawful interception of traffic associated with a network device in an internet protocol (IP) network, comprising
providing a lawful interception device in a physical IP network infrastructure that also includes at least a first switch, a monitored network device associated with a party of interest, and at least one other network device;
configuring a Virtual Local Area Network (VLAN) comprising the lawful interception device and the monitored network device in a logical network infrastructure; and
monitoring traffic on the VLAN using the lawful interception device, including monitoring packets between the monitored network device and one or more other network devices without the party of interest being aware of the monitoring;
wherein the lawful interception device configures the VLAN by sending a request to the first switch with VLAN configuration information comprising at least one of port grouping information, MAC-layer address information, IP multicast group information, IEEE 801.1Q frame tag information, Generic Attribute Registration Protocol (GARP) tag information, and GARP VLAN Registration Protocol (GVRP) drop/add information in the same manner that switches would configure VLANs;
wherein the lawful interception device and the monitored network device are end-nodes in relation to the first switch.

2. The method according to claim 1, wherein the first switch uses Generic Attribute Registration Protocol (GARP) VLAN Registration Protocol (GVRP) to configure the VLAN.

3. The method according to claim 1, wherein the lawful interception device and the monitored network device are in the same static broadcast domain.

4. The method according to claim 1, wherein the lawful interception device and the monitored network device belong to different class-C networks.

5. The method according to claim 1 wherein the traffic monitored on the VLAN includes multimedia data transported over real-time transport protocol (RTP) channels.

6. The method according to claim 5 wherein the multimedia data monitored on the VLAN includes a voice communication, a video, and a fax transmission.

7. The method according to claim 1 wherein the physical IP network infrastructure includes a second switch in operative communication with the first switch via a router, wherein the lawful interception device is an end-node in relation to the first switch and the monitored network device is an end-node in relation to the second switch.

8. The method according to claim 7, wherein the lawful interception device and the monitored network device are in different static broadcast domains.

9. The method according to claim 7 wherein the first switch uses Generic Attribute Registration Protocol (GARP) VLAN Registration Protocol (GVRP) to configure the VLAN.

10. The method according to claim 7 wherein the second switch uses Generic Attribute Registration Protocol (GARP) VLAN Registration Protocol (GVRP) to configure the VLAN.

11. The method according to claim 7 wherein the lawful interception device configure the VLAN by acting as a switch and sending requests to the first and second switches.

12. A method for packet interception in an internet protocol (IP) telephone network, comprising:
providing an interception customer premises equipment (CPE) in a physical IP network infrastructure that also includes at least a first switch, a monitored CPE associated with a party of interest, and one or more other CPEs;
configuring a Virtual Local Area Network (VLAN) comprising the interception CPE and the monitored CPE in a logical IP network infrastructure; and
intercepting traffic on the VLAN using the interception CPE, including intercepting packets between the monitored CPE and at least one other CPE;
wherein the interception CPE configures the VLAN by sending a request to the first switch with VLAN configuration information comprising at least one of port grouping information, MAC-layer address information, IP multicast group information, IEEE 801.1Q frame tag information, Generic Attribute Registration Protocol (GARP) tag information, and GARP VLAN Registration Protocol (GVRP) drop/add information in the same manner that switches would configure VLANs;
wherein the interception CPE and the monitored CPE are end-nodes in relation to the first switch.

13. The method according to claim 12 wherein the interception CPE, monitored CPE, and other CPEs are connected via at least one of ADSL and ISDN.

14. The method according to claim 12 wherein the VLAN is configured using simple network management protocol (SNMP).

15. A system, comprising:
a physical network infrastructure comprising at least a first switch, an interception device, a monitored network device, and at least one other network device; and
a logical network infrastructure comprising a virtual local area network (VLAN) that includes the interception device and the monitored network device;
wherein the interception device monitors traffic on the VLAN, including packets between the monitored network device and one or more other network devices without the party of interest being aware of the monitoring;
wherein the interception device configures the VLAN by sending a request to the first switch with VLAN configuration information comprising at least one of port grouping information, MAC-layer address information, IP multicast group information, IEEE 801.1Q frame tag information, Generic Attribute Registration Protocol (GARP) tag information, and GARP VLAN Registration Protocol (GVRP) drop/add information in the same manner that switches would configure VLANs;
wherein the interception device and the monitored network device are end-nodes in relation to the first switch.

16. The system according to claim 15 wherein the first switch uses Generic Attribute Registration Protocol (GARP) VLAN Registration Protocol (GVRP) to configure the VLAN.

17. The system according to claim 15 wherein the interception device and the monitored network device belong to different classic C networks.

18. The system according to claim 15 wherein the physical IP network infrastructure includes a second switch in operative communication with the first switch via a router, wherein the interception device is an end-node in relation to the first switch and the monitored network device is an end-node in relation to the second switch.

* * * * *